United States Patent
CieChanski et al.

(10) Patent No.: US 9,709,008 B2
(45) Date of Patent: Jul. 18, 2017

(54) SUPERCHARGER EXHAUST BYPASS

(71) Applicant: EATON CORPORATION, Cleveland, OH (US)

(72) Inventors: Ryan Douglas CieChanski, Chelsea, MI (US); Grant Stephen Terry, Marshall, MI (US)

(73) Assignee: Eaton Corporation, Cleveland, OH (US)

( * ) Notice: Subject to any disclaimer, the term of this patent is extended or adjusted under 35 U.S.C. 154(b) by 27 days.

(21) Appl. No.: 14/976,920

(22) Filed: Dec. 21, 2015

(65) Prior Publication Data

US 2016/0108859 A1 Apr. 21, 2016

Related U.S. Application Data

(63) Continuation-in-part of application No. PCT/US2014/043100, filed on Jun. 19, 2014.
(Continued)

(51) Int. Cl.
*F01N 3/10* (2006.01)
*F01N 3/20* (2006.01)
(Continued)

(52) U.S. Cl.
CPC ............. *F02M 26/03* (2016.02); *F01N 3/206* (2013.01); *F02B 37/164* (2013.01);
(Continued)

(58) Field of Classification Search
CPC . F01N 3/206; F01N 3/103; F01N 5/00; F02B 37/164; F02B 2037/122;
(Continued)

(56) References Cited

U.S. PATENT DOCUMENTS

| | | |
|---|---|---|
| 3,967,929 A | 7/1976 | Tamazawa et al. |
| 5,119,795 A | 6/1992 | Goto et al. |
| (Continued) | | |

FOREIGN PATENT DOCUMENTS

| | | |
|---|---|---|
| DE | 10357402 A1 | 7/2005 |
| DE | 102004042272 A1 | 3/2006 |
| (Continued) | | |

OTHER PUBLICATIONS

International Search Report and Written Opinion for PCT/US2014/043100 mailed Oct. 24, 2014, 9 pages.
(Continued)

*Primary Examiner* — Mark Laurenzi
*Assistant Examiner* — Dapinder Singh
(74) *Attorney, Agent, or Firm* — Mei & Mark LLP

(57) ABSTRACT

A supercharger exhaust bypass system, comprises a supercharger comprising an inlet and outlet, a bypass valve connected to the supercharger outlet, a first intercooler connected to receive compressed air from the outlet of the supercharger and connected to cool and expel air, a second intercooler comprising an envelope inlet, an exhaust inlet, an exhaust outlet, an exhaust passage between the exhaust inlet and the exhaust outlet, and an envelope connected to the envelope inlet and surrounding the exhaust passage, an engine system connected to receive expelled air from the first intercooler and further connected to output exhaust to the exhaust inlet of the second intercooler, and a bypass conduit connected to the bypass valve and connected to the envelope inlet.

36 Claims, 8 Drawing Sheets

Related U.S. Application Data

(60) Provisional application No. 61/837,700, filed on Jun. 21, 2013, provisional application No. 61/870,487, filed on Aug. 27, 2013.

(51) Int. Cl.

| | | |
|---|---|---|
| *F02M 25/07* | (2006.01) | |
| *F02B 37/16* | (2006.01) | |
| *F02M 26/03* | (2016.01) | |
| *F02M 26/06* | (2016.01) | |
| *F02M 26/23* | (2016.01) | |
| *F02B 37/12* | (2006.01) | |
| *F02M 35/10* | (2006.01) | |
| *F02B 29/04* | (2006.01) | |
| *F02M 26/22* | (2016.01) | |
| *F01N 5/00* | (2006.01) | |

(52) U.S. Cl.
CPC .... *F02M 25/0704* (2013.01); *F02M 25/0727* (2013.01); *F02M 25/0754* (2013.01); *F02M 26/06* (2016.02); *F01N 3/103* (2013.01); *F01N 5/00* (2013.01); *F02B 29/04* (2013.01); *F02B 2037/122* (2013.01); *F02M 26/22* (2016.02); *F02M 26/23* (2016.02); *F02M 35/10386* (2013.01)

(58) Field of Classification Search
CPC F02B 29/04; F02M 25/0704; F02M 25/0727; F02M 25/0754; F02M 26/03; F02M 26/06; F02M 26/23; F02M 26/22
USPC ........................................ 60/280, 602, 605.2
See application file for complete search history.

(56) References Cited

U.S. PATENT DOCUMENTS

| | | |
|---|---|---|
| 6,089,211 A | 7/2000 | Wenger |
| 7,654,086 B2* | 2/2010 | Gong ...................... F02B 33/34 60/611 |
| 7,926,272 B2 | 4/2011 | Takemoto |
| 8,108,129 B2* | 1/2012 | Nakayama .......... F02D 41/0072 123/568.18 |
| 8,341,939 B2 | 1/2013 | Lee |
| 2004/0084031 A1* | 5/2004 | Ito ........................... F02B 37/16 123/568.21 |
| 2008/0196404 A1 | 8/2008 | Kassner |
| 2009/0007563 A1* | 1/2009 | Cooper ................... F02B 33/32 60/600 |
| 2009/0255251 A1 | 10/2009 | Paffrath |
| 2010/0307465 A1 | 12/2010 | Haldeman |
| 2011/0173962 A1 | 7/2011 | Miwa et al. |
| 2011/0214422 A1 | 9/2011 | VanDyne et al. |
| 2013/0047604 A1 | 2/2013 | Andrasko et al. |

FOREIGN PATENT DOCUMENTS

| | | |
|---|---|---|
| EP | 0415128 | 3/1991 |
| EP | 1586842 A1 | 10/2005 |
| FR | 2961254 A3 | 12/2011 |
| JP | 05296052 | 11/1993 |
| JP | 2003-247423 | 5/2003 |
| JP | 2005-042672 | 2/2005 |
| JP | 2005220778 | 8/2005 |
| JP | 2006307722 | 11/2006 |

OTHER PUBLICATIONS

Extended European Search Report for Application No. 14813807.6 prepared Dec. 16, 2016, mailed Jan. 9, 2017, pp. 1-8.

\* cited by examiner

SUPERCHARGER EXHAUST BYPASS

This application claims the benefit of priority of provisional U.S. patent applications 61/870,487, filed Aug. 27, 2013 and 61/837,700, filed Jun. 21, 2013, the contents of which are incorporated herein by reference in their entirety. This application also claims the benefit of priority, and is a continuation-in-part of, PCT/US2014/043100, filed Jun. 19, 2014, also incorporated by reference in its entirety.

TECHNICAL FIELD

The present disclosure relates generally to an exhaust gas cooling system. More specifically, to a combustion system for a vehicle where compressed air from a supercharger is diverted to a cooling envelope of an intercooler for cooling combustion exhaust gases prior to a catalyst.

BACKGROUND

Vehicles, such as cars, trucks, or work machines, use a supercharger to enhance efficiency of the engine and to increase engine power. A supercharger is a device that pressurizes the air intake to above atmospheric pressure. By pressurizing air, the supercharger enables a greater mass of oxygen per cycle of the engine to be available for combustion. More specifically, more fuel is needed to produce more power. However, one cannot simply add more fuel into the engine if there is not enough oxygen to burn the fuel. By providing more oxygen to the system, the supercharger makes adding more fuel to the system possible. Since more fuel is available to be burned and more work can be done per cycle, the power produced by the engine is increased. Supercharging may add more horsepower and more torque to a driveline of the vehicle.

To provide more power to the vehicle, however, the efficiency of the supercharger needs to be at its peak. The supercharger outlet air may be recirculated back through the inlet of the supercharger to reduce the pressure and input power the engine receives during conditions where maximum supercharger power is not required. This circular bypass, however, results in wasted capacity and returns heated air to the inlet of the supercharger, thus reducing supercharger efficiency. In this case, for a supercharger to work at peak efficiency, the heated, compressed air exiting the supercharger must be cooled before it enters a combustion chamber of the engine.

In addition, the exhaust gas emitted from the engine goes through a catalyst, such as a catalytic converter, before being emitted out of the vehicle. The catalyst functions to convert the toxic byproducts of combustion in the exhaust to less toxic substances through chemical reactions. The temperature at which exhaust catalysts usually operate is around 150-600° C., though some catalysts can function at higher temperatures. Although many catalysts are designed to withstand prolonged high-temperature operation and repeated exposure to temperatures in excess of 800° C., a high temperature may pose a number of serious effects. High temperature may affect all the components of the catalysts. For example, the noble metal particles may sinter, resulting in a decrease in the fraction of the metal available for catalytic reactions.

One way to lower the temperature of exhaust gas going into the catalyst is to inject fuel into the exhaust stream. However, this would result in an increase in fuel use and a decrease in fuel economy.

Therefore, an improved system to maximize the efficiency of the supercharger as well as to cool the exhaust gases going into the catalyst is needed.

SUMMARY

In one embodiment, a supercharger exhaust bypass system may comprise a supercharger comprising an inlet and outlet; a bypass valve connected to the supercharger outlet; a first intercooler connected to receive compressed air from the outlet of the supercharger and connected to cool and expel air; a second intercooler comprising an envelope inlet, an exhaust inlet, an exhaust outlet, an exhaust passage between the exhaust inlet and the exhaust outlet, and an envelope connected to the envelope inlet and surrounding the exhaust passage; an engine system connected to receive expelled air from the first intercooler and further connected to output exhaust to the exhaust inlet of the second intercooler; and a bypass conduit connected to the bypass valve and connected to the envelope inlet.

In another embodiment, a supercharger exhaust bypass system may comprise a supercharger for compressing air, comprising an inlet and outlet; a first bypass valve connected to the supercharger outlet; a first intercooler connected to receive compressed air from the outlet of the supercharger and connected to cool and expel air; a second intercooler comprising an envelope inlet, an exhaust inlet, an exhaust outlet, an exhaust passage between the exhaust inlet and the exhaust outlet, and an envelope connected to the envelope inlet and surrounding the exhaust passage; an engine system connected to receive expelled air from the first intercooler and further connected to output exhaust to the exhaust inlet of the second intercooler; a bypass conduit connected to the first bypass valve and connected to the envelope inlet; an exhaust gas recirculation (EGR) valve connected to receive exhaust from the exhaust outlet; and a third intercooler connected to the EGR valve to cool the received exhaust, wherein the third intercooler is further connected to the inlet of the supercharger.

It is to be understood that both the foregoing general description and the following detailed description are exemplary and explanatory only and are not restrictive of the invention, as claimed.

BRIEF DESCRIPTION OF THE DRAWINGS

The accompanying drawings are incorporated in and constitute a part of this specification.

DETAILED DESCRIPTION

Reference will now be made in detail to the accompanying drawings. Wherever possible, the same reference numbers will be used throughout the drawings to refer to the same or like parts.

Figure 1A:
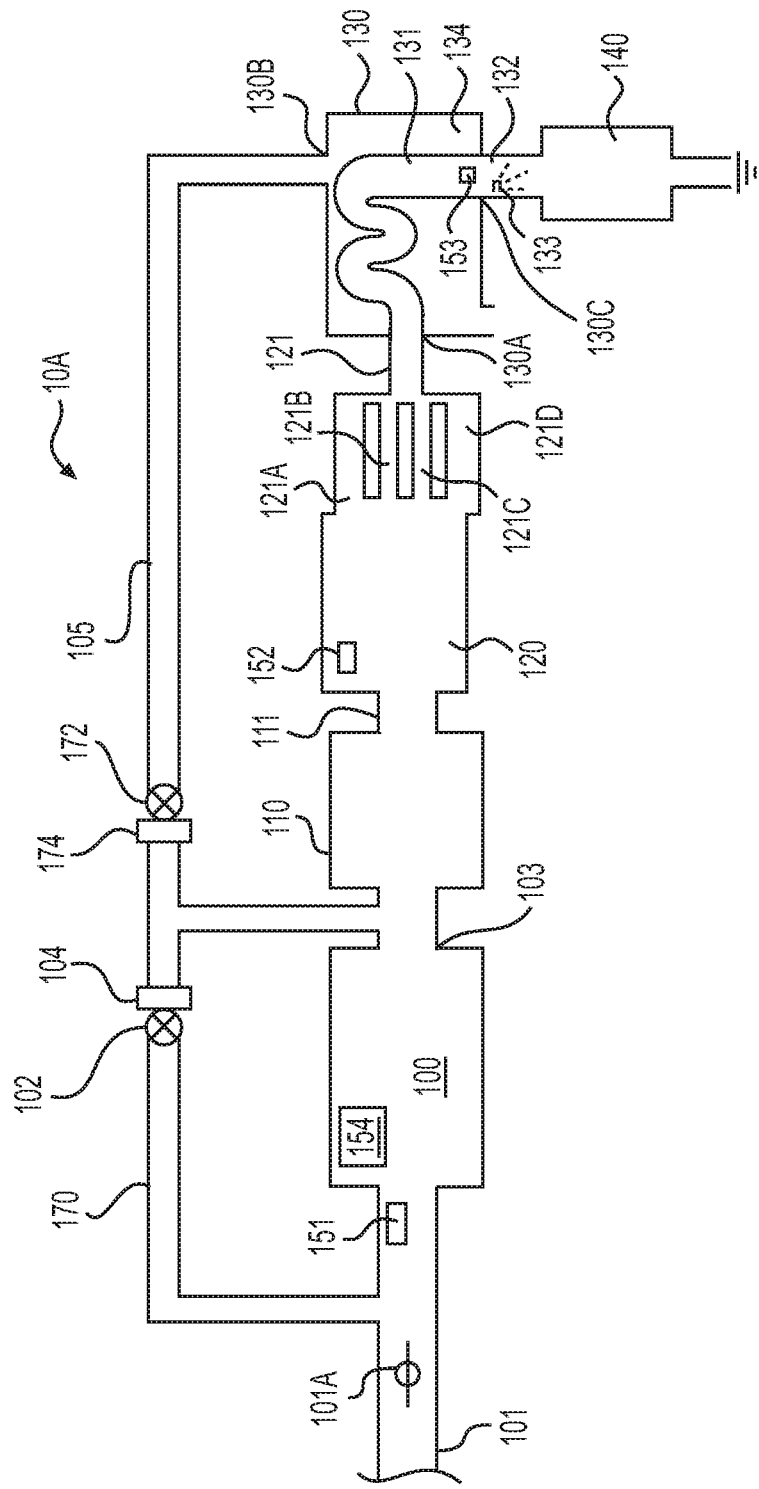
FIGS. 1A & 1B are block diagrams of a supercharger exhaust bypass system.

FIG. 1A shows an example of a supercharger exhaust bypass system 10A. The supercharger 100 may supply variable quantities of air to an engine 120 of a vehicle by pressurizing the intake air to above atmospheric pressure. This enables a greater mass of oxygen per cycle of the engine to be available for combustion. The supercharger 100 may be sized based upon the airflow needs. In some embodiments, supercharger 100 is sized to have a greater capacity than the engine airflow demands under all engine operating conditions so that there is always an excess supply of compressed air from supercharger 100. In other embodiments, supercharger 100 is sized to have a peak capacity commensurate with maximum engine air flow demand. This smaller sized supercharger arrangement would not have an oversupply of air for cooling purposes under all operating conditions. In both embodiments, it is possible to include a continuously variable drive mechanism with control means for varying supercharger speed to meet engine airflow demands.

Figure 1B:
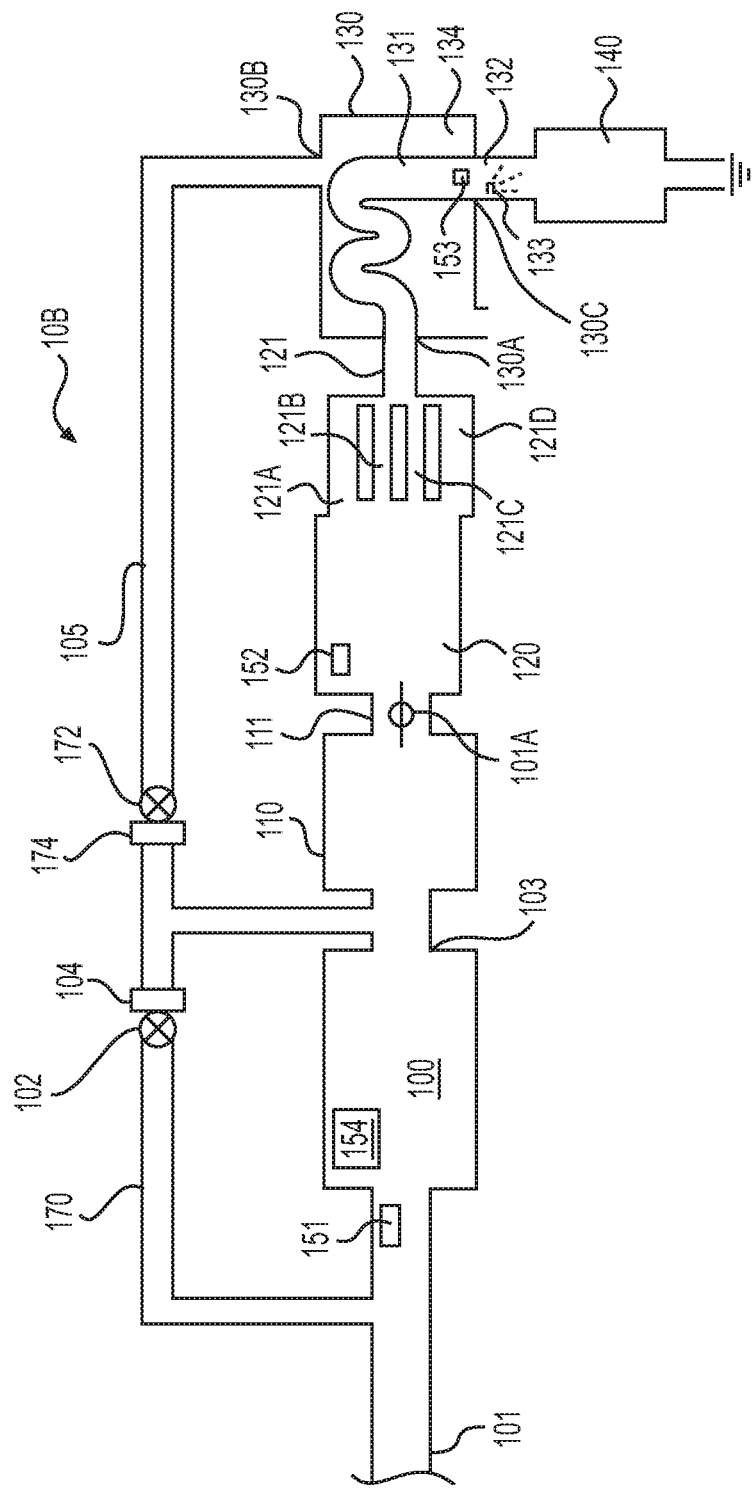
Figure 3A:
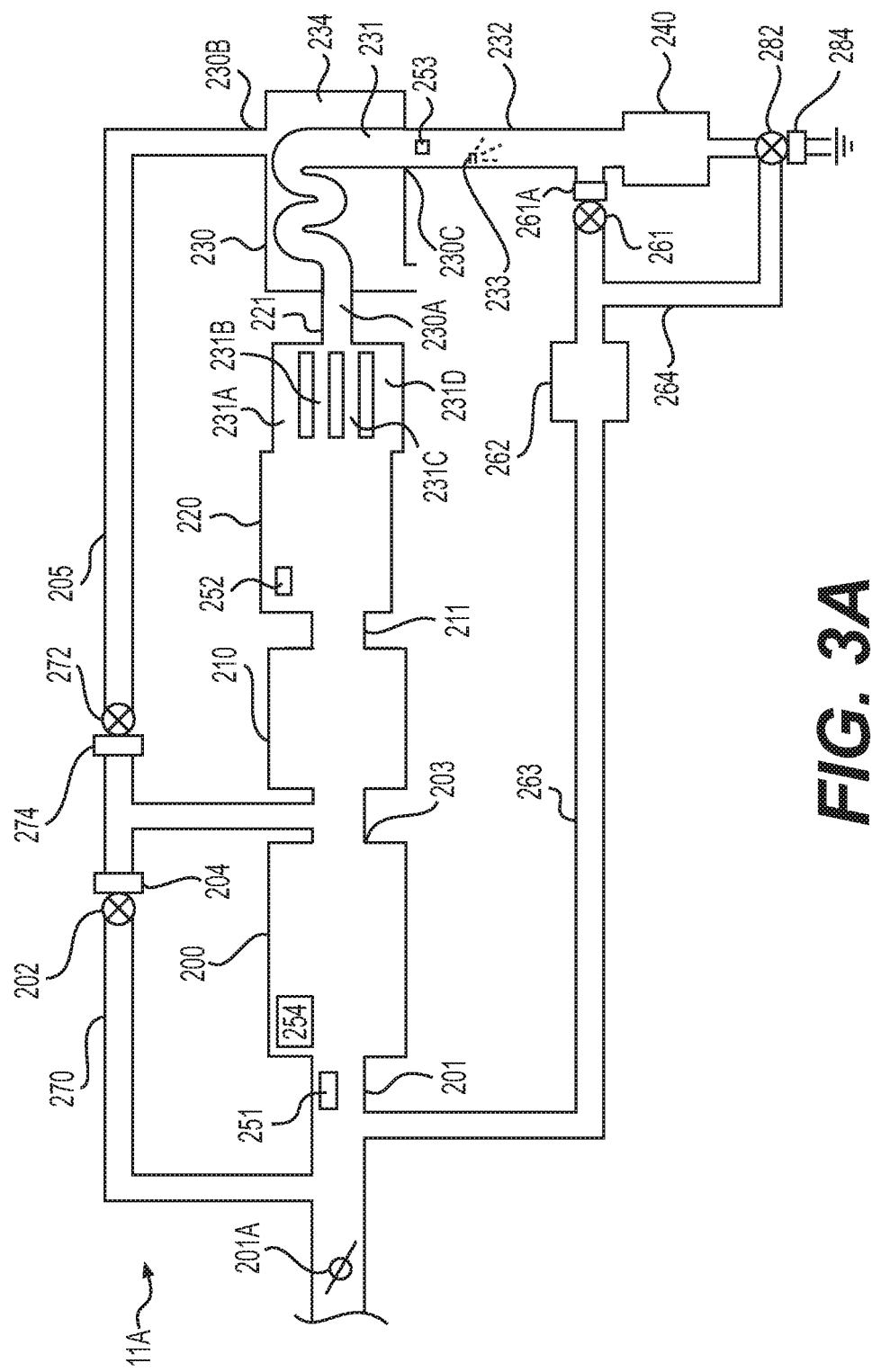
FIGS. 3A & 3B are block diagrams of another embodiment of a supercharger exhaust bypass system.
Figure 3B:
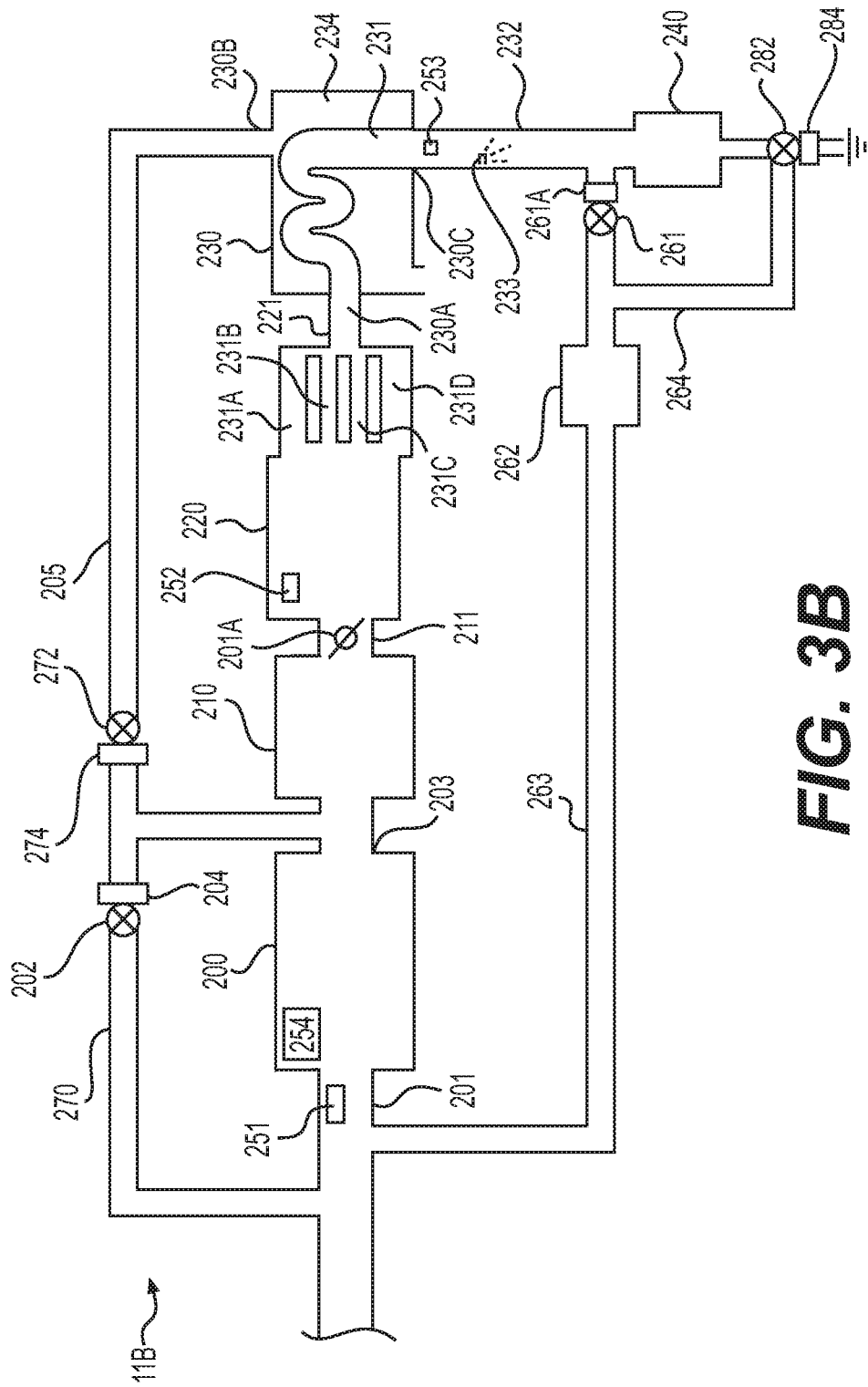

The supercharger 100 may be a positive displacement air pump, for example, a Roots type or twin screw. Or, with additional modification, supercharger 100 may be a centrifugal type. The vehicle can have an air inlet 101 with a throttle valve 101A. Supercharger 100 may have an air inlet connected to the air inlet 101 and an outlet 103. The supercharger 100 may receive air from the air inlet 101. This air may be ambient, and thus, come from an air intake duct. A throttle valve 101A may be placed in the air inlet 101 to regulate the air intake to supercharger 100, as shown in FIGS. 1A and 3A. The throttle valve 101A can be placed in the air inlet 101 before or after an alternative intake bypass duct 170. An alternative location for throttle valve 101B, shown in FIGS. 1B and 3B, is between the intercooler 110 and the engine 120.

Once air enters the supercharger 100, the supercharger 100 may compress this air above atmospheric pressure without creating a vacuum, resulting in it being heated. For instance, the temperature of ambient air entering the supercharger 100 through the inlet 101 may be around 30° C. After the same air is compressed, the temperature of air leaving the supercharger 100 is between 100-150° C. The air with high temperature loses its density, thus it cannot expand as much during the combustion when it is combined with the fuel to form the charge. As a result, the compressed air with the high temperature may hurt engine performance. In other words, the heated air can make the engine less efficient. Therefore, the compressed air out of the supercharger 100 may need to be cooled prior to entering an engine 120.

The outlet 103 of the supercharger 100 may be connected to an intercooler 110. The intercooler 110 may cool the compressed air transferred via the outlet 103 to maintain engine efficiency. The intercooler 110 may be an air-to-air or air-to-water type.

Then the cooled air may be directed to an engine 120 via a passage 111, which may include an intake manifold. The engine 120 uses the compressed air to generate power. The engine 120 may contain components that are commonly used in the art. For instance, the engine 120 may have four, six, or eight cylinders. These cylinders may be arranged in any one of inline, V, or flat form. Further, the engine 120 may contain key parts, such as spark plug, valves, piston, piston rings, connecting rod, crankshaft, and sump, the details of which are not provided herein. The engine 120 is connected to an engine exhaust port 121 that combines exhaust outlet passages 121A, 121B, 121C, 121D of an exhaust manifold. After completion of combustion, the engine exhaust gases is discharged through exhaust outlet passages 121A, 121B, 121C, 121D and to the engine exhaust port 121. The engine exhaust gases, via the combustion, may heat up to 1000° C. The heated engine exhaust gases need to be cooled down again because they may damage a catalyst 140 if they enter without being cooled. Such a cooling occurs at a second intercooler 130.

The second intercooler 130 has intake ports 130A, 130B and an outlet port 130C. The second intercooler 130 may receive the engine exhaust gases through intake port 130A. In addition, the second intercooler 130 may receive the compressed air through the intake port 130B, which is connected to the supercharger 100 through a bypass valve 102 and the bypass passage 105. The second intercooler 130 may be an air-to-air intercooler. The second intercooler 130 may further consist of a central passage 131 and an envelope 134.

The cooling in the second intercooler 130 may proceed as follows. Depending on the need, the exhaust bypass valve 102 may be opened or closed by control commands received at actuator 104. Actuator 104 may be an integral component for bypass valve 102. If the exhaust bypass valve 102 is opened, some or all of the compressed air from the supercharger 100 may travel through bypass passage 105 and may enter into the intercooler 130 via the air intake port 130B. The compressed air does not mix with the engine exhaust gases, which are in the central passage 131 of the second intercooler 130. Rather the compressed air may circulate in an envelope 134 around the central passage 131. Since the compressed air in the envelop 134 is much cooler than the temperature of exhaust gases in the central passage 131, e.g., 100-150° C. compared to 1000° C., heat transfer occurs. As a result, the temperature of the exhaust gases exiting the second intercooler 130 may be lower than when they entered into the second intercooler 130. For instance, the temperature of the exhaust gases entering the second intercooler 130 is 1000° C. After the exhaust gases pass through central passage 131, which is surrounded by bypassed air, the temperature of the exhaust gases coming out of the second intercooler 130 may be between 800-900° C. In addition, the exhaust gases may be cooled to 150-600° C.

If the exhaust bypass valve 102 is closed, then no compressed air is fed to the envelope 134 and fuel may be injected in to the exhaust stream to cool down the engine exhaust gases. In this case, a fuel injector 133 may be placed in second exhaust passage 132 and fuel injector 133 may be controlled to inject fuel into the exhaust gas stream. Cooling the exhaust gases using excess fuel, however, may cause fuel inefficiency since it requires more fuel to be added into the system. Thus, it is beneficial to develop a control strategy and control system to minimize cooling fuel injection. Such a system monitors the ability of the supercharger to meet engine airflow demands and simultaneously supply compressed air to the cooling envelope 134.

It is further possible to include an alternative intake bypass duct 170. By opening valve 102 and closing valve 172, compressed air can be returned to the inlet side of the supercharger. Or, by closing valve 102 and opening valve 172, intake air can be diverted to air intake port 130B. So, if the compressed air is fed to the engine at full capacity, valve 102 is closed, but cooling of envelope 134 can continue by porting intake air along intake bypass duct 170 and bypass passage 105. Because intake air is supplied to envelope 134, it is possible to exhaust the air directly to atmosphere.

After the exhaust gases are cooled, the exhaust gases may be moved to the catalyst 140. The catalyst 140 converts harmful pollutants in the exhaust gases into less harmful gases before they leave the vehicle exhaust system. The exhaust gases can consist of nitrogen gas ($N_2$), carbon dioxide ($CO_2$), water vapor ($H_2O$), carbon monoxide (CO), hydrocarbon (VOCs), and nitrogen oxides (NOx). Among those gases, the later three gases are most harmful, and thus, the catalyst 140 may be used to reduce all three gases. The catalyst 140 may be a two-way or three-way catalytic converter. In addition, the catalyst 140 may comprise more than one filter unit or filter cartridge to perform pollution reduction.

The catalyst 140 consists of a reduction catalyst and oxidation catalyst (not shown). The reduction catalyst may use platinum (Pt) and rhodium (Rh) to reduce NOx emissions. The reduction catalyst may take away nitrogen from the NOx molecule, and thus, allow oxygen in the form of $O_2$. Therefore, harmful NOx may be reduced. The oxidation catalyst may use platinum (Pt) and palladium (Pd). The oxidation catalyst may reduce the unburned hydrocarbons and carbon monoxide by burning. In other words, the oxidation catalyst may aid the reaction of hydrocarbons and carbon monoxide using the separated oxygen using the reduction catalyst. After exhaust gases go through the catalyst 140, it may be emitted out of the vehicle. The above is an example of a catalyst, and other catalytic structures may be used.

Figure 2:
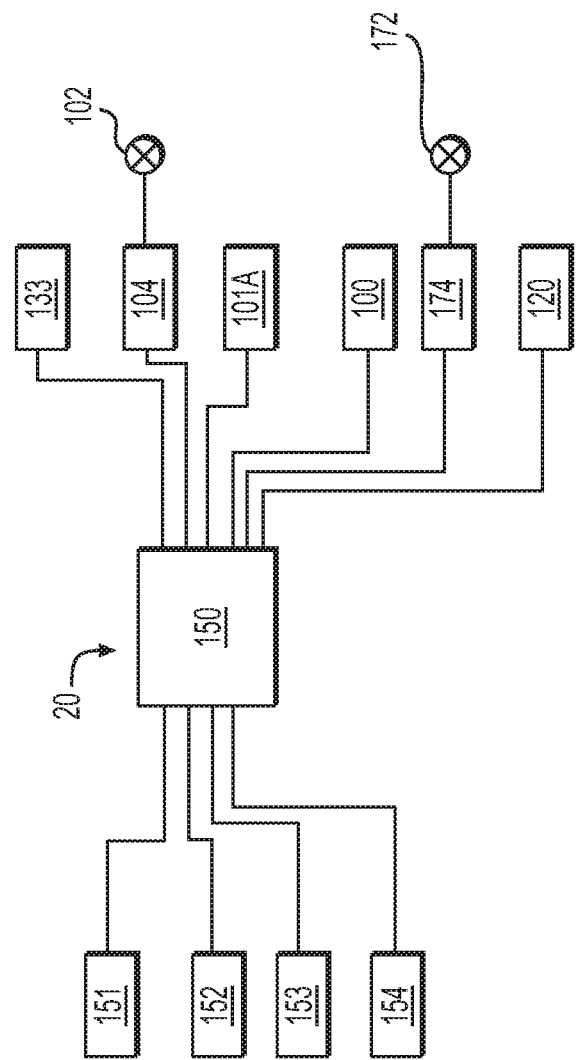
FIG. 2 is an example of a diversion mechanism of a supercharger exhaust bypass system.

FIG. 2 shows an air diversion mechanism 20 in detail. The supercharger 100 may produce more compressed air than the engine 120 may need. For instance, if the engine 120 is idle, then the engine 120 may not need as much air. If too much air is added into the engine, then a lean air fuel ratio may occur. The lean air fuel ratio means the amount of air is more than the amount of fuel. When there is a lean air fuel ratio, one of the consequences may be that the car may not start. On the other hand, if there is too little air being pump into the engine 120, it would result in a rich air/fuel ratio. The rich air/fuel ratio would cause lack of power or cause the engine to run sluggish.

The air diversion mechanism 20 may control air diversion through the system 10, allowing some portion of air to divert to or away from entering into the engine 120. The diversion mechanism 20 may be a part of a control mechanism employed in a vehicle, such as on-board computers, computing chips, and other processing devices that control many aspects of vehicle operation. The control mechanism includes customary computing elements, such as transmit and receive ports, processor, memory, and programming. Multiple processing devices are possible, as discussed in more detail in FIG. 4, such that a dedicated processor can handle certain calculations, while another processor shares tasks.

The diversion mechanism 20 may be a part of an engine control unit (ECU). The diversion mechanism 20 can include a controller 150, sensors 151, 152, 153, 154, valve actuators 104 & 174, the bypass valve 102, the valve 172, the throttle valve 101A, and optional fuel injector 133. The number and placement of sensors may vary based on feedback control implemented, and so the system may have more or less sensors and actuators than in the illustrated example. The sensors may be of a variety of types capable of sensing conditions and of sending signals, such as temperature, pressure, speed, or air flow (velocity). The illustrated sensors may include a plurality of types, such that a sensor may measure multiple conditions, such as both temperature and air flow.

The exhaust bypass valve 102 and the throttle valve 101A may be opened or closed as determined by the controller 150. The controller 150 may control an opening degree of the exhaust bypass valve 102, valve 172, and the throttle valve 101A. An opening degree of the exhaust bypass valve 102, valve 172, and the throttle valve 101A may range from fully open to fully closed. An amount of cooling fuel injection may be calculated by the controller 150. The controller 150 is hardware that may receive inputs from the sensors 151, 152, and 153, and may process the inputs using a processor and stored algorithms. Thus, the controller 150 may include a non-transitory storage device for storing the received data and algorithms. A transmission component within the controller 150 may emit control signals to actuatable devices, such as the illustrated fuel injector 133, throttle valve 101A, and actuator 104. The actuator 104 may in turn control the bypass valve 102. The actuator 174 can control the valve 172. Additional control programming can control the engine 120 in response to sensed conditions. For example, control programming can adjust valve timing in response to sensed air temperature or pressure.

The sensor 151 may be positioned inside the inlet 101 near the throttle valve 101A. The sensor 151 may be a mass air flow sensor (MAF), measuring the mass flowrate of the air entering the inlet 101. For example, the sensor 151 may be a hot wire sensor.

The sensor 152 may be positioned inside the engine 120. The sensor 152 may be a mass air flow sensor (MAF), measuring the mass flowrate of the air entering the engine 120. For example, the sensor 152 may be a hot wire sensor.

The sensor 153 may be positioned near the outlet of central passage 131 in the outlet port 132. Sensor 153 can sense the temperature and amount of the exhaust gas passing toward catalyst 140. This can provide feedback to the diversion mechanism 20 so that additional adjustments can be made to cool the exhaust. One such adjustment includes control of an optional fuel injector 133, which can be included to further cool the exhaust before it enters the catalyst 140. Other adjustments can include adjusting the opening degree of one or both of bypass valve 102 and throttle valve 101A.

The sensors 151, 152 may work as follows. The wire of the sensors 151, 152 placed in the air stream is heated. Then either a constant voltage or current may be applied over the wire. When the temperature of the wire increases, the electrical resistance increases. As a result, amount of current or voltage varies based on the principle of Ohm's Law. Afterward, the hot wire is cooled down as the air passes the wire, resulting a proportional drop of the current or voltage. The current or voltage drop in the wire is proportional to the mass of air flowing past the wire. The measurement of the drop is converted to a signal which is sent to the controller 150. Other types of sensors may be used so long as they provide the appropriate temperature and flow-rate data to the control system.

When the controller 150 receives the signals from the sensors 151, 152, 153, 154, the controller 150 can evaluate the signals. The controller 150 can compare the signal received from the sensor 151 with a predetermined number. This predetermined number can be what the air intake in the inlet 101 should be in order to make the engine run at an ideal stoichiometric air/fuel ratio. If the signal received from sensor 151 is equal to the predetermined value, then the controller 150 will not send a control signal. However, if the signal from sensor 150 is greater than or less than the predetermined value, then the controller will send a signal to adjust the opening degree of throttle valve 101A.

In addition, the controller 150 may compare the signal received from the sensor 152 with another predetermined number. This predetermined number is what the flowrate of air in the engine should be to achieve the ideal stoichiometric air/fuel ratio. The predetermined number that the signal from the sensor 151 is being compared to may be different from the predetermined number that signal from the sensor 152 is being compared to. If the signal received is equal to the predetermined value, then the controller 150 will not transmit a signal to adjust the system. However, if the signal received is less than or greater than the predetermined value, then the controller will send a signal to adjust the opening degree of one or both of throttle valve 101A and bypass valve 102 to increase or decrease the amount of air in the system. The actuator 104 may move the bypass valve 102 to an open position, allowing the air to divert to the air intake port 130B. Additional programming and processing may be supplied to determine the degree to which the bypass valve 102 should open or close based on the signals received.

For example, when the sensors provide signals that cause the controller to determine that the engine 120 is not receiving enough air, then the controller 150 can calculate the amount of air needed to reach the ideal air flow to the engine. The controller 150 can send a signal to open throttle valve 101A, but in the instance that the throttle valve is already open to its maximum, then it may be necessary to restrict air passing through bypass valve 102. Such an adjustment to bypass valve 102 can affect the cooling in second intercooler 130, and so the controller may then adjust the amount of fuel injected by fuel injector 133 so that the exhaust reaches the correct temperature before entering catalyst 140.

Should engine 120 receive too much air, as measured by sensor 152, the controller 150 can determine how much to restrict air through throttle valve 101A and can determine how much to open bypass valve 102. With increased cooling effect as bypass valve 102 opens, controller 150 may then restrict fuel injection by fuel injector 133.

With the above control strategy, an additional alternative includes a speed sensor 154 included in supercharger 100. The controller 150 can determine if and when it is beneficial to increase or decrease the speed of the input shaft and rotors in the supercharger to affect air flow in the system 10.

It also possible to adjust the engine valve timing, fuel ratio, crankshaft speed, or other parameters in response to the air flow supplied to the engine. The control system can consider tradeoffs between air supply to the engine for combustion versus air supplied to envelope 134 for cooling of the exhaust stream, and the control system can be programmed to make comparisons and select the most fuel efficient option. Or, when performance is an issue, the control system can be programmed to select the option that gives the correct torque output for the operating conditions.

While one goal of the air flow control is to optimize engine air flow for optimal fuel use, the systems 10A & 10B can be optimized for cooling at second intercooler 130. That is, supercharger 100 can be adjusted to increase or decrease air available to envelope 134. Throttle valve 101A and bypass valve 102 can also be adjusted to increase or decrease air to envelope 134. Increased air to envelope 134 is desirable to reduce fuel use by fuel injector 133. However, exhaust filters work at ideal temperature ranges, and so if the exhaust temperature reaches the minimum temperature for optimal processing by catalyst 140, then air to cooling envelope 134 can be restricted.

The predetermined numbers may be derived from varying air flow requirements of the engine and the predetermined numbers may change as engine air flow demands change. For example, during acceleration, the engine may need to ramp the amount of air supplied as power output needs of the vehicle change. The position of bypass valve 102 may change as the air flow needs change. In addition to, or alternatively to, the speed of the supercharger 100 may be adjusted to meet engine air flow demand while also meeting cooling needs at second intercooler 130.

To meet cooling needs at the second intercooler 130, additional air flow and air temperature sensors may be included in, for example, the envelope 134. The additional sensors may be monitored to determine the amount of heat remaining in the exhaust gases. The envelope 134 may be monitored to determine if additional air flow capacity can be accommodated in the envelope. If so, feedback to the controller 104 may take place, thus adjusting bypass valve 102. Additional feedback can adjust the operating speed of the supercharger 100 to meet envelope air flow capacity.

Figure 5:
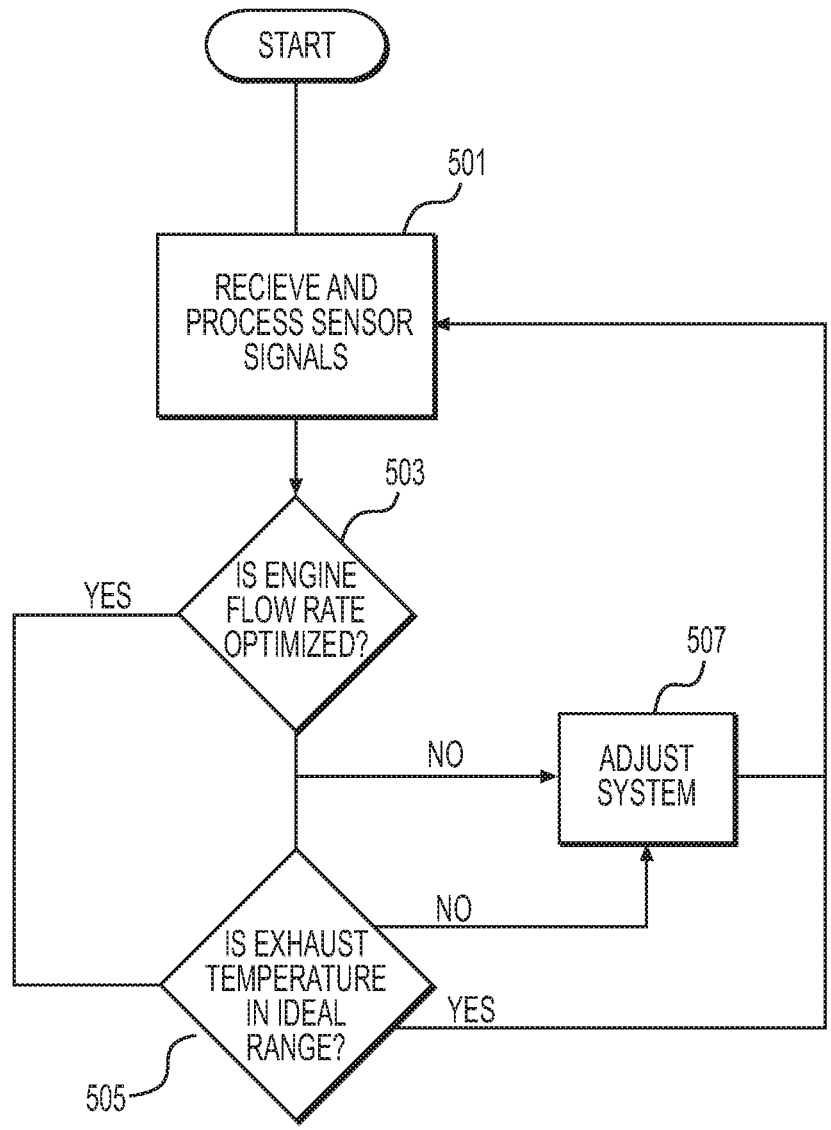
FIG. 5 is a flow chart of the controller decision making process of FIG. 2.

As summarized in FIG. 5, the diversion mechanism 20 operates by receiving and processing sensor signals is step 501. The controller determines if the engine flow rate is optimized in step 503. If yes, the diversion mechanism 20 proceeds to check if the exhaust temperature is in the ideal range in step 505. If the exhaust temperature is ideal, no adjustments take place, and the process returns to step 501. If either step 503 or 505 return a negative result, then the system 10A or 10B is adjusted in step 507 with feedback provided by returning to step 501.

FIGS. 3A & 3B show other embodiments of the present application. A supercharger exhaust bypass system 11A or 11B comprises a supercharger 200, a first intercooler 210, an engine 220, and a second intercooler 230. The supercharger 200 connects to an inlet 201, a throttle valve 201A, and outlet 203. The first intercooler 210 may be connected to a passage 211 that leads the cooled air into an intake manifold of the engine 220. The engine 220 may include an exhaust manifold having exhaust outlet passages 221A, 221B, 221C, 221D, which are connected to the exhaust port 221. The second intercooler may comprise intake ports 230A, 230B and an outlet port 230C. Additionally sensors 251, 252, 253, 254, actuator 204, bypass valve 202, and fuel injector 233 may be included. These components are same as that of systems 10A & 10B, above, that were previously described in reference to FIGS. 1A, 1B, and 2. Therefore, the descriptions are not repeated.

The supercharger exhaust bypass systems 11A & 11B may employ a catalyst 240 and/or exhaust gas recirculation (EGR) to reduce harmful gases emission and to increase the efficiency of the engine 220. First, the supercharger exhaust bypass system 11A or 11B may use both the catalyst 240 and EGR. Exhaust gases coming out of the engine 220 may enter the second intercooler 230 through an inlet 230A. Exhaust gases pass through a central passage 231 for cooling. Since compressed air is diverted using a bypass valve 202, the compressed air will enter through the inlet port 230B and in to envelop 234 to circulate around the central passage 231. The compressed air does not mix with the exhaust. Then heat transfer takes place and the exhaust gases inside the central passage 231 may be cooled.

As the cooled exhaust gases exit the second intercooler 230 from central passage 231 in to second exhaust passage 232, it is possible to divert some portion of the exhaust gases for EGR. However, when the system is operating to bypass intake air to the envelope 234, it is desirable to filter the EGR gas at catalyst 240. So, if a combination of fresh intake and EGR fluids are to be transmitted through the system 11A or 11B, the valve 261 is closed by actuator 261A. Valve 282 is opened by actuator 284. This diverts filtered exhaust to intercooler 262 and back to inlet 201. EGR can be used in cooling envelope 234, or can be combusted by engine 220, or both, depending on the amount of opening or closing of the valves 202 & 272. Since the exhaust is filtered by catalyst 240, it can be expelled from cooling envelope 234 to atmosphere.

In another alternative, the optional diversion valve 261 and actuator 261A are used. If EGR gas is to be combusted, with no diversion of intake air to cooling envelope 234, EGR valve 261 is opened via controls to an actuator 261A, which may be an integrated component of the EGR valve 261. The other portion of exhaust gases may enter the catalyst 240 to be emitted out of the system 11A or 11B. The exhaust gases entering the EGR valve 261 may enter an intercooler 262 for additional cooling. The intercooler 262 is optional, and may be an air-to-air intercooler or air-to-water intercooler. Cooled exhaust gases may recirculate to an inlet 201 through a recirculation passage 263. Since unfiltered EGR gas has been transmitted to inlet 201, the valve 272 is closed to prevent the EGR gas from exiting envelope 234. Bypass back to inlet 201 via valve 202 is still possible. The intake and EGR fluids can be controlled, compressed, cooled, and fed to engine 220.

If the valve 272 is closed, then only EGR is being used by the supercharger exhaust bypass system 11A or 11B. As a result, the exhaust gases from the engine 220, gases moving through port 221 and passage 231, may not be cooled in the second intercooler 230. Rather, the exhaust gases may be cooled using a fuel injector 233. The fuel injector 233 may be placed close to the outlet of second intercooler in second exhaust passage 232 and may inject fuel onto the exhaust stream. Once the exhaust gases are cooled, it may enter the EGR valve 261 and go through the intercooler 262 for the further cooling. Conventional EGR recirculates a portion of the engine exhaust gases back to the engine in order to reduce the production of NOx. However, EGR may recirculate a portion of the exhaust gases back to the inlet 201, thus allowing it to re-enter to the supercharger 200 and go through portions of supercharger exhaust bypass system 11A or 11B. By having the recirculation of the exhaust gases in this design to an inlet 201 of the supercharger 200, the systems 11A and 11B may have some benefits. One of the benefits may be that the recirculated exhaust gas is compressed to increase the amount fed to the engine. When the exhaust gases enter the inlet port 201 and combine with the air, then such a combination may increase mass flow. Therefore, it may increase the amount of fluid fed to the engine. At the same time, EGR may reduce the temperature of the combustion chamber. NOx is primarily formed when nitrogen and oxygen is subjected to the high temperature. Therefore, by having the lower temperature combustion chamber, it reduces the amount of NOx the combustion generates. Thus, an EGR system may comprise at least programmable bypass valves 261, 282, intercooler 262, and recirculation passages 263 & 264. Passage 264 can alternatively connect after intercooler 262, and before inlet 201.

Supercharger exhaust bypass system 11A can further comprise an optional intake bypass duct 270 and valve 272 and actuator 274. By opening valve 202 and closing valve 272, compressed air can be returned to the inlet 201 of the supercharger 200. Or, by closing valve 202 and opening valve 272, intake air can be diverted to air intake port 230B. So, if the compressed air is fed to the engine at full capacity, valve 202 is closed, but cooling of envelope 234 can continue by porting intake air along intake bypass duct 270 and bypass passage 205. Because intake air is supplied to envelope 234, it is possible to exhaust the air directly to atmosphere. It is possible to control bypass valve 261 to open or close based on whether fresh air is diverted through intake bypass duct 270.

So, under high speed vehicle operation, or high load vehicle operation, it is possible to close valves 272 and 202, or valves 102 and 172, so as to supply the engine with optimal output from the supercharger. But, when the engine does not need the full output capacity of the supercharger, it is possible to open valves 272 and 202, or valves 102 and 172, to divert charge air to respective envelope 234 or 134. When a large capacity supercharger is paired with the engine, such that an oversupply of charge air is always available, it is possible to meet full engine needs across its operating range while controlling the degree to which valves 272 and 202, or valves 102 and 172, are opened.

Figure 4:
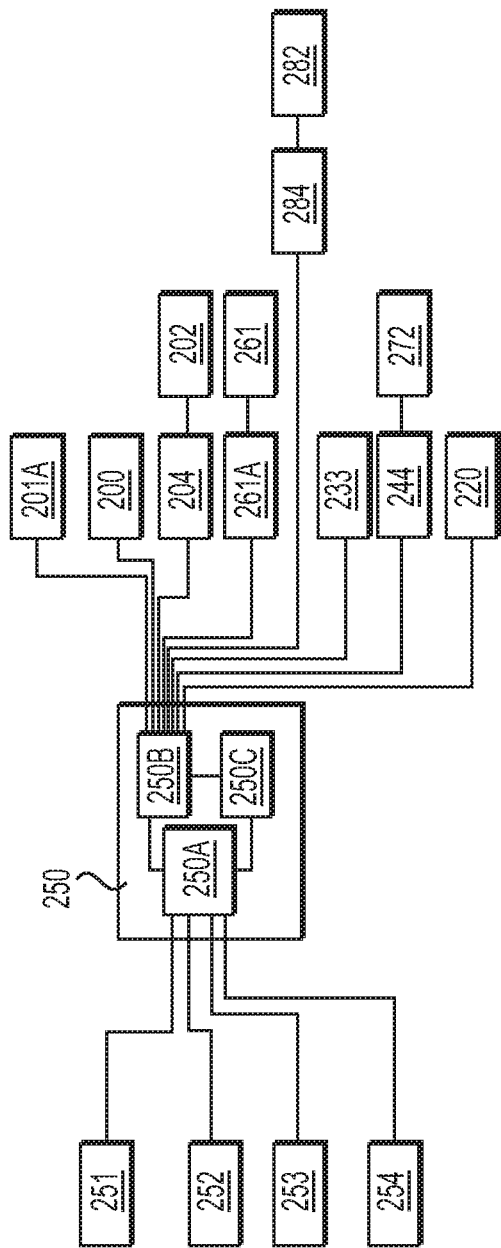
FIG. 4 is an example of an exhaust gas recirculation control mechanism of the supercharger exhaust bypass system of FIG. 3A or 3B.

FIG. 4 illustrates an EGR control mechanism 30 that controls the opening or closing of the EGR valve 261 as well as to control the portion of exhaust gas being circulated through EGR. The EGR control mechanism 30 may be a part of a non-transitory control mechanism employed in a vehicle such as on-board computers, computing chips, and other processing devices that control many aspects of vehicle operation. As above, the EGR control mechanism 30 includes computing elements such as a central processor 250A, a second processor (control signal calculator 250C), memory, programming, transmitter 250B, and receiver. The EGR control mechanism 30 may be a part of an engine control unit (ECU). The EGR control mechanism 30 may comprise a controller 250, sensors 251, 252, 253, 254, and actuators 204, 261A. The bypass valve 202 and EGR valve 261 may be opened or closed by the controller 250. The controller 250 may control an opening degree of the exhaust bypass valve 202 and the EGR valve 261. An opening degree of the exhaust bypass valve 202 and the EGR valve 261 may range from fully open to fully close. The controller 250 may receive inputs from the sensors 251, 252, 253, and 254 and relay the appropriate signals to the actuators 204, 261A. Additional signals may be sent to supercharger 200 and throttle valve 201A to control air flow, as above. The EGR control system 30 of FIG. 4 is very similar to the diversion mechanism 20 above for FIGS. 2 and 5, but additional control is implemented for the actuators 204, 261A and valves 202, 261.

The controller 250 may interpret the inputs received from the sensors 251, 252, 253, 254 and send the appropriate signals to control exhaust bypass valve 202 and EGR valve 261 to be opened or closed. Since it is ideal to filter exhaust gas before it exits the system, it is preferable that, when the EGR valve 261 is open, then the bypass valve 202 is closed. Intermittent opening and closing is possible.

The controller 250 may also interpret the inputs received from the sensors to control the degree of opening of valves 272 & 282 via respective actuators 274 & 284.

Controller 250 can include programming for controlling engine 220 similarly as above for engine 120.

Both sensors 251 and 252 may be a mass air flow sensor (MAF), measuring the mass flowrate of the air entering the inlet port 201 of the supercharger 200 and the engine 220, respectively. The sensor 251 may be placed on the inlet port 201 and measure the air flow rate of the air coming into the inlet port 201 through a throttle 201A. The measurement may be sent to the controller 250. Similarly, the sensor 252 may be placed inside the engine 220. The sensor 252 may also measure the flow rate inside the engine 220 and send the measurement to the controller 250 to be analyzed. The sensor 253 may be placed on the second intercooler outlet 232. The sensor 253 may be a temperature sensor that measures the temperature of exhaust gases coming out of the second intercooler 230. When the sensor 253 measures the temperature of the exhaust gases, it may send the measurement to the controller 250. Sensor 254 may be a speed sensor to determine the speed of an input shaft or rotors in supercharger 200. And, as above, additional sensors may be used to measure and use the capacity of the envelope 234. Thus the system may have more or fewer sensors than those illustrated.

Figure 6:
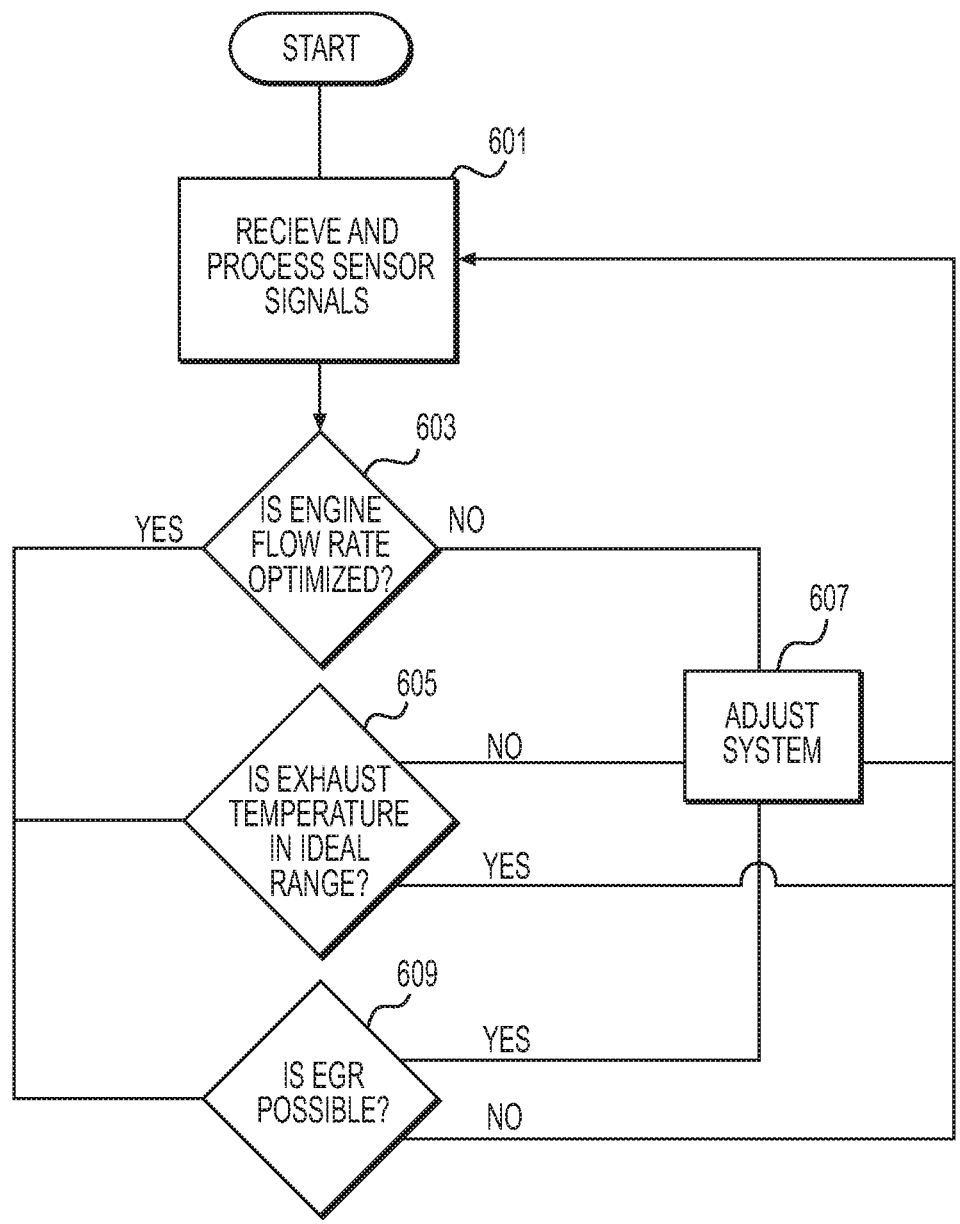
FIG. 6 is a flow chart of the controller decision making process of FIG. 4.

When the controller 250 receives the inputs from each sensor 251, 252, 253, and 254, the controller 250 may compare each input with predetermined values. The comparisons may be done as above for FIGS. 2 and 5, with additional control, as shown in FIGS. 4 and 6, for EGR.

The throttle 201A and valves 202 and 261 may be actuated to the degree necessary to ensure optimal airflow to the engine 220 and or cooling envelope 234. The opening degree of the throttle 201A and valves 202 and 261 may range from fully open to fully close. That is, EGR can be used with or without bypass of compressed air to the envelope 234. As above, additional programming and calculations can be included in controller 250 to determine the optimal airflow to engine 220.

In addition to the closing and opening of the bypass valve 202, the EGR control mechanism 30 may also control the opening degree of the EGR valve 261. The system may require only a partial opening of the EGR valve 261, allowing only a certain portion of the exhaust gases to enter into the EGR 260. When the inputs from the sensors 251 and 252 are received by the controller 250, the controller 250 makes comparison with calculated or predetermined values to decide whether there is enough air in either inlet or at engine as discussed.

For example, while doing the comparison, if the input signals are less than the predetermined values, then the controller 250 will send signals to control the system 11. At that time, the controller 250 may also process more detailed information such as how much air shortage or excess there is compared to the predetermined values. The controller includes a control signal calculator 250C that will compute a degree of shortage or air excess by calculating the number that is required to make the input equal to the predetermined numbers. Upon receiving the information from the control signal calculator 250C, the transmitter 250B may emit a signal to activate the actuator 261A so that the EGR valve 261 will be opened by the certain opening degree calculated to allow only enough exhaust gases to recirculate through the EGR 260. Like calculations can be made for each of throttle 201A and bypass valve 202.

Alternatives include sensor and control mechanisms to adjust the operating speed of the supercharger 100 or 200 to increase or decrease air output therefrom. An additional alternative includes the supercharger with an operating range from an idled condition to a peak limiting speed and control mechanism that controls the supercharger and bypass valve across its whole operating range. The system may include a combustion engine that has an operating range from an idled condition up to a peak limiting speed. The combustion engine may have variable air flow demands along the operating range. A supercharger that the system utilizes may be sized to oversupply air relative to engine airflow demands under all engine operating conditions. Thus, excess compressed air is available under all engine operating conditions for use in the cooling envelopes 134 and 224. On the other hand, a supercharger that the system utilizes may be sized small, so that oversupply of air relative to engine airflow demands occurs under only some engine operating conditions. Thus, excess compressed air is not available for all engine operating conditions and the controller may force the bypass valve to fully close along the peak limiting speed of the engine. Therefore, a corollary is to have the supercharger with an operating range from an idled condition to a peak limiting speed, and the controller controls the supercharger across its whole operating range.

As shown in FIG. 6, a control strategy may include receiving and processing sensor signals at step 601. The controller 250 can determine if engine flow rate is optimized in step 603. If it is optimized, then the system can determine if the exhaust temperature is in an ideal range in step 605, or make adjustments in step 607. Contemporaneously, the EGR control mechanism 30 can determine if EGR is possible in step 609. If so, adjustments are made in step 607. Should engine air flow rate need adjustment, those are also made in step 607. Feedback is received by repeating step 601.

Because the system adjustments in steps 507 and 607 can be processor-intensive, it may be beneficial to include an optional integrator component in each of controllers 150 and 250 to integrate instructions from the various determinations and calculations.

While the application has described the use of positive displacement superchargers and at least two intercoolers, the bypass cooling effect is also achieved by eliminating the first intercooler 110 or 210. A centrifugal supercharger may also be used to compress air, and as such, the system may be turbosupercharged with appropriate connections to spin the turbo.

In the preceding specification, various embodiments have been described with reference to the accompanying drawings. Various other modifications and changes may be made thereto without departing from the broader scope of the claims that follow. The specification and drawings are accordingly to be regarded in an illustrative rather than restrictive sense. Other embodiments will be apparent to those skilled in the art from consideration of the specification and by practice of the disclosure. It is intended that the specification and examples be considered as exemplary only, with the true scope and spirit of the invention being indicated by the following claims.

We claim:
1. A supercharger exhaust bypass system, comprising:
 a supercharger comprising an inlet and outlet;
 a bypass valve connected to the supercharger outlet;
 a first intercooler connected to receive compressed air from the outlet of the supercharger and connected to cool and expel air;
 a second intercooler comprising an envelope inlet, an exhaust inlet, an exhaust outlet, an exhaust passage between the exhaust inlet and the exhaust outlet, and an envelope connected to the envelope inlet and surrounding the exhaust passage;
 an engine system connected to receive expelled air from the first intercooler and further connected to output exhaust to the exhaust inlet of the second intercooler; and
 a bypass conduit connected to the bypass valve and connected to the envelope inlet.
2. The system of claim 1, further comprising:
 a catalyst connected to the exhaust outlet of the second intercooler; and
 a fuel injector between the exhaust outlet of the second intercooler and the catalyst.

3. The system of claim 1, wherein air exhausted from the engine system is not mixed with air diverted from the supercharger to the envelope.

4. The system of claim 1, wherein the second intercooler is an air-to-air type.

5. The system of claim 1, wherein the engine system comprises a combustion engine, and the combustion engine has an operating range from an idled condition up to a peak limiting speed, and the combustion engine further has variable air flow demands along the operating range, wherein the supercharger is sized to oversupply air relative to the engine airflow demands along the whole operating range, and wherein excess compressed air is available under all engine operating conditions for use in the envelope of the second intercooler.

6. The system of claim 1, further comprising:
an intake air bypass duct connected to the supercharger inlet and connected to the bypass conduit; and
an actuatable valve connected to the intake air bypass duct,
wherein, when the actuatable valve is open, air at the inlet is diverted to the bypass conduit.

7. The system of claim 6, wherein, when the actuatable vale is closed, and when the bypass valve is open, charge air from the outlet is diverted to the inlet.

8. The system of claim 1, further comprising an air diversion mechanism comprising sensors, controllers, actuators, a processor, a memory, and processor-executable programming stored on the memory, the programming, when executed by the processor, configured to:
adjust an opening degree of the bypass valve, and
adjust the speed of an input shaft in the supercharger.

9. The system of claim 8, wherein the engine system comprises a combustion engine, and the combustion engine has an operating range from an idled condition up to a peak limiting speed, and the combustion engine further has variable air flow demands along the operating range, wherein the supercharger is sized to not oversupply air relative to the engine air flow demands along the whole operating range, and wherein the bypass valve is controlled to fully close along the peak limiting speed of engine.

10. The system of claim 8, wherein the engine system comprises a combustion engine, and the combustion engine has an operating range from an idled condition up to a peak limiting speed, and the combustion engine further has variable air flow demands along the operating range, wherein the supercharger has an operating range from an idled condition to a peak limiting speed, and wherein the controller controls the supercharger across its whole operating range.

11. The system of claim 8, further comprising:
a plurality of sensors configured to sense conditions and to send signals, and
a controller configured to receive the signals, process the signals, and emit commands to adjust the bypass valve.

12. The system of claim 11, further comprising a supercharger speed sensor configured to sense speed and to send speed signals, wherein the controller is further configured to receive and process the speed signals and to emit commands to adjust the speed of an input shaft in the supercharger.

13. The system of claim 11, further comprising a throttle, wherein the controller is further configured to emit commands to adjust the throttle.

14. The system of claim 11, wherein the plurality of sensors comprise at least an air flow sensor at the inlet of the supercharger, an air flow sensor at an outlet of the intercooler, and an engine air flow sensor.

15. The system of claim 1, further comprising:
an exhaust gas recirculation (EGR) valve connected to receive exhaust from the exhaust outlet; and
a third intercooler connected to the EGR valve to cool the received exhaust, wherein the third intercooler is further connected to the inlet of the supercharger.

16. The system of claim 15, wherein the second intercooler is an air-to-air type.

17. The system of claim 15, further comprising an EGR control system comprising a plurality of sensors, controllers, actuators, a processor, a memory, and processor-executable programming stored on the memory, the programming, when executed by the processor, configured to:
adjust an opening degree of the first bypass valve, and
adjust the speed of an input shaft in the supercharger.

18. The system of claim 17, wherein:
the plurality of sensors are configured to sense conditions and to send signals, and
the controller is configured to receive the signals, process the signals, and emit commands to adjust the opening degree of first bypass valve and an opening degree of the EGR valve.

19. The system of claim 17, further comprising a supercharger speed sensor configured to sense a rotational speed of an input shaft of the supercharger and to send speed signals, wherein the controller is further configured to receive and process the speed signals and to emit commands to adjust the speed of the input shaft of the supercharger.

20. A method of diverting air in a supercharger bypass system, comprising:
compressing intake air using a supercharger and expelling the compressed air to a combustion engine;
receiving and processing sensor signals from sensors;
comparing the received sensor signals with predetermined values to determine if engine flow rate is optimized and to determine if exhaust temperature is in an ideal range;
adjusting a degree of a bypass valve opening to control an amount of compressed air being diverted from the supercharger to an envelope of a second intercooler, and
exhausting gas from the combustion engine to a central passage of the second intercooler.

21. The method of claim 20, further comprising adjusting a degree of opening of a second valve to control an amount of intake air being diverted from the inlet side of the supercharger to the envelope.

22. A supercharger exhaust bypass system, comprising:
a supercharger for compressing air, the supercharger comprising an inlet and an outlet;
a first bypass valve connected to the supercharger outlet;
an intercooler comprising an envelope inlet, an exhaust inlet, an exhaust outlet, an exhaust passage between the exhaust inlet and the exhaust outlet, and an envelope connected to the envelope inlet and surrounding the exhaust passage;
a combustion engine system connected to receive compressed air from the supercharger and further connected to output exhaust to the exhaust inlet of the intercooler; and
a bypass conduit connected to the first bypass valve and connected to the envelope inlet.

23. The system of claim 22, further comprising another intercooler connected to receive compressed air from the outlet of the supercharger and connected to cool and expel air, wherein the another intercooler is between the supercharger and the engine.

24. The system of claim 22, further comprising a throttle, wherein the controller is further configured to emit commands to adjust the throttle.

25. The system of claim 22, further comprising an exhaust passage, a fuel injector in the exhaust passage, and a catalyst.

26. The system of claim 22, further comprising an exhaust gas recirculation (EGR) valve connected to receive exhaust from the exhaust outlet, and a third intercooler connected to the EGR valve to cool the received exhaust, wherein the third intercooler is further connected to the inlet of the supercharger.

27. The system of claim 22, further comprising:
a catalyst connected to receive exhaust from the exhaust outlet;
an exhaust gas recirculation (EGR) valve connected to receive exhaust after the catalyst receives the exhaust; and
a recirculation passage connected between the EGR valve and the supercharger inlet.

28. The system of claim 22, further comprising:
an intake air bypass duct connected to the supercharger inlet and connected to the bypass conduit; and
an actuatable valve connected to the intake air bypass duct,
wherein, when the actuatable valve is open, air at the inlet is diverted to the bypass conduit.

29. The system of claim 28, wherein, when the actuatable vale is closed, and when the bypass valve is open, charge air from the outlet is diverted to the inlet.

30. The system of claim 22, further comprising:
a plurality of sensors configured to sense conditions and to send signals, and
a controller configured to receive the signals, process the signals, and emit commands to adjust the first bypass valve.

31. The system of claim 30, further comprising a supercharger speed sensor configured to sense speed and to send speed signals, wherein the controller is further configured to receive and process the speed signals and to emit commands to adjust the speed of an input shaft in the supercharger.

32. The system of claim 30, wherein the plurality of sensors comprise at least an air flow sensor at the inlet of the supercharger, an air flow sensor at an outlet of the intercooler, and an engine air flow sensor.

33. The system of claim 30, wherein the combustion engine system comprises a combustion engine, and the combustion engine has an operating range from an idled condition up to a peak limiting speed, and the combustion engine further has variable air flow demands along the operating range, wherein the supercharger is sized to not oversupply air relative to the engine air flow demands along the whole operating range, and wherein the controller controls the bypass valve to fully close along the peak limiting speed of the combustion engine.

34. The system of claim 33, wherein the controller controls the bypass valve to fully close during the combustion engine idled condition.

35. The system of claim 30, wherein the combustion engine system comprises a combustion engine, and the combustion engine has an operating range from an idled condition up to a peak limiting speed, and the combustion engine further has variable air flow demands along the operating range, wherein the supercharger has an operating range from an idled condition to a peak limiting speed, wherein the controller controls the supercharger across its whole operating range, and wherein the controller controls a degree of opening of the bypass valve along the operating range of the combustion engine.

36. The system of claim 35, wherein the controller controls the bypass valve to fully close during the combustion engine idled condition.

* * * * *